United States Patent
Vichare et al.

(10) Patent No.: US 10,963,358 B2
(45) Date of Patent: *Mar. 30, 2021

(54) USAGE PROFILE BASED RECOMMENDATIONS

(71) Applicant: Dell Products L. P., Round Rock, TX (US)

(72) Inventors: Nikhil M. Vichare, Austin, TX (US); Abhinav Gupta, Austin, TX (US); Arturo Ramos, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,885

(22) Filed: Jan. 30, 2020

(65) Prior Publication Data

US 2020/0210302 A1 Jul. 2, 2020

Related U.S. Application Data

(63) Continuation of application No. 15/994,406, filed on May 31, 2018, now Pat. No. 10,599,538.

(51) Int. Cl.
*G06F 11/30* (2006.01)
*G06F 9/50* (2006.01)
(Continued)

(52) U.S. Cl.
CPC ........ *G06F 11/302* (2013.01); *G06F 9/44505* (2013.01); *G06F 9/5038* (2013.01); *H04L 67/303* (2013.01)

(58) Field of Classification Search
CPC .......... G06F 11/3409; G06F 8/61; G06F 8/65; G06Q 30/0282; G06Q 30/0631
See application file for complete search history.

(56) References Cited

U.S. PATENT DOCUMENTS 7,881,745 B1 * 2/2011 Rao ................ H04L 67/303
455/551
8,214,494 B1 * 7/2012 Slavin ................ G06F 8/65
709/224
(Continued)

FOREIGN PATENT DOCUMENTS

CN 105988836 A * 10/2016
CN 105988836 A 10/2016

OTHER PUBLICATIONS

Tokuta, Shean S., U.S. Patent and Trademark Office, Non-Final Office Action dated Aug. 22, 2019 for U.S. Appl. No. 15/994,406, 15 pages.
(Continued)

*Primary Examiner* — Shean Tokuta
(74) *Attorney, Agent, or Firm* — Campbell Stephenson LLP; S. Naimpally

(57) ABSTRACT

A server may receive a device profile from a computing device. The device profile may identify a usage of at least software applications associated with the computing device. The server may perform a comparison of the device profile with other device profiles associated with other computing devices, determine a similarity index of the device profile with individual ones of the other device profiles, and select a subset of the other device profiles based on the similarity index to create a set of similar device profiles. The server may determine configuration differences between the device profile of the computing device and individual device profiles of the similar device profiles, determine recommendations based on the configuration differences, and send the recommendations to the computing device. Implementing one or more of the recommendations may cause the one or more tasks to execute faster or use less of one or more computing resources.

20 Claims, 6 Drawing Sheets

(51) Int. Cl.
*G06F 9/445* (2018.01)
*H04L 29/08* (2006.01)

(56) References Cited

U.S. PATENT DOCUMENTS

| | | | | |
|---|---|---|---|---|
| 8,219,983 | B1* | 7/2012 | Sobel | G06F 11/3409 717/168 |
| 8,555,273 | B1* | 10/2013 | Chia | G06F 8/654 717/173 |
| 8,874,705 | B1* | 10/2014 | Satish | G06F 11/008 709/221 |
| 9,111,219 | B1* | 8/2015 | Mohla | G06N 20/00 |
| 9,563,900 | B1* | 2/2017 | Guo | G06Q 30/0201 |
| 10,277,618 | B1* | 4/2019 | Wu | H04L 63/1416 |
| 2004/0236843 | A1* | 11/2004 | Wing | H04L 67/34 709/219 |
| 2005/0216784 | A1* | 9/2005 | Srinivasan | G06Q 10/00 714/4.2 |
| 2010/0082567 | A1* | 4/2010 | Rosenblatt | G06F 16/40 707/705 |
| 2010/0299719 | A1* | 11/2010 | Burks | H04W 4/50 726/3 |
| 2011/0015802 | A1* | 1/2011 | Imes | G05D 23/1923 700/300 |
| 2011/0289497 | A1* | 11/2011 | Kiaie | G01N 33/48792 717/171 |
| 2011/0307354 | A1* | 12/2011 | Erman | G06Q 30/0282 705/27.1 |
| 2011/0320307 | A1* | 12/2011 | Mehta | G06Q 30/0641 705/26.7 |
| 2012/0116381 | A1* | 5/2012 | Houser | H02J 7/0045 606/33 |
| 2012/0290336 | A1* | 11/2012 | Rosenblatt | H04B 5/00 705/5 |
| 2013/0085886 | A1* | 4/2013 | Satish | G06Q 30/02 705/26.7 |
| 2013/0196615 | A1* | 8/2013 | Zalmanovitch | H04M 15/60 455/405 |
| 2014/0114901 | A1* | 4/2014 | Pradhan | G06Q 30/0631 706/50 |
| 2014/0149582 | A1* | 5/2014 | Chien | H04L 67/303 709/224 |
| 2014/0156539 | A1* | 6/2014 | Brunet | G06Q 30/01 705/304 |
| 2014/0198702 | A1* | 7/2014 | Lin | H04W 4/06 370/312 |
| 2015/0113172 | A1* | 4/2015 | Johnson | H04L 67/125 709/245 |
| 2016/0019046 | A1* | 1/2016 | Chen | G06F 8/65 717/168 |
| 2016/0092768 | A1* | 3/2016 | Patil | G06F 8/61 706/46 |
| 2017/0171729 | A1* | 6/2017 | Fox | H04L 61/1588 |
| 2017/0351226 | A1* | 12/2017 | Bliss | G05B 19/4063 |
| 2018/0077188 | A1* | 3/2018 | Mandyam | H04L 67/42 |
| 2018/0089131 | A1* | 3/2018 | Burns | G06F 13/4068 |
| 2018/0302494 | A1* | 10/2018 | Jain | H04L 67/34 |
| 2018/0367484 | A1* | 12/2018 | Rodriguez | H04L 67/36 |
| 2020/0210302 | A1* | 7/2020 | Vichare | G06F 9/5038 |
| 2020/0241871 | A1* | 7/2020 | Sharma | G06F 21/572 |

OTHER PUBLICATIONS

Tokuta, Shean S., U.S. Patent and Trademark Office, Notice of Allowance dated Dec. 16, 2019 for U.S. Appl. No. 15/994,406, 23 pages.

* cited by examiner

USAGE PROFILE BASED RECOMMENDATIONS

BACKGROUND OF THE INVENTION

Field of the Invention

This invention relates generally to computing devices and, more particularly to determining a usage profile of a computing device, performing a comparison of the usage profile with a set of other usage profiles of other computing devices, determining a subset of the other usage profiles that are similar to the usage profile of the computing device, determining recommendations for the computing device based on the subset of the other usage profiles, and implementing at least one of the recommendations on the computing device. The usage profile may indicate how one or more of software, hardware. or peripherals associated with the computing device are being used.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern computing devices, such as desktops, laptops, and tablets, often can be purchased in a wide variety of configurations, ranging from devices designed primarily for accessing the internet to devices designed to quickly perform processing intensive tasks such as photo editing, video editing, and the like. A computing device may enable a user to modify the configuration of (i) individual hardware components and/or (ii) individual software applications. For example, the user may be able to modify the configuration to efficiently use power to extend battery life. The user may be able to modify the configuration to increase the processor's clock speed to reduce the time taken to perform tasks, while increasing an amount of power being consumed (e.g., thereby reducing battery life), increasing an amount of heat being generated, etc. The user may be able to modify the configuration to enable a software application to manage certain system resources to enable tasks performed by the software application to be performed quickly.

However, the user may be able to make so many different configuration modifications that the user may become confused as to which modifications to make. Further, the user may inadvertently make incorrect modifications. In addition, some modifications may speed up tasks performed by a first software application while unintentionally slowing down tasks performed by a second software application. Thus, a user may find it difficult to understand how to configure individual hardware components and/or individual software applications of a computing device.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive a device profile from a computing device. The device profile may have been filtered by the computing device to remove personally identifiable information (PII). The device profile may identify a usage of (1) software applications, (2) hardware components associated with the computing device, and (3) peripherals that are associated with the computing device. The server may perform a comparison of the device profile with other device profiles associated with other computing devices, determine a similarity index of the device profile with individual ones of the other device profiles, and select a subset of the other device profiles based on the similarity index to create a set of similar device profiles. The server may determine one or more configuration differences between the device profile of the computing device and individual device profiles of the similar device profiles, determine one or more configuration recommendations based on the one or more configuration differences, and send the one or more configuration recommendations to the computing device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
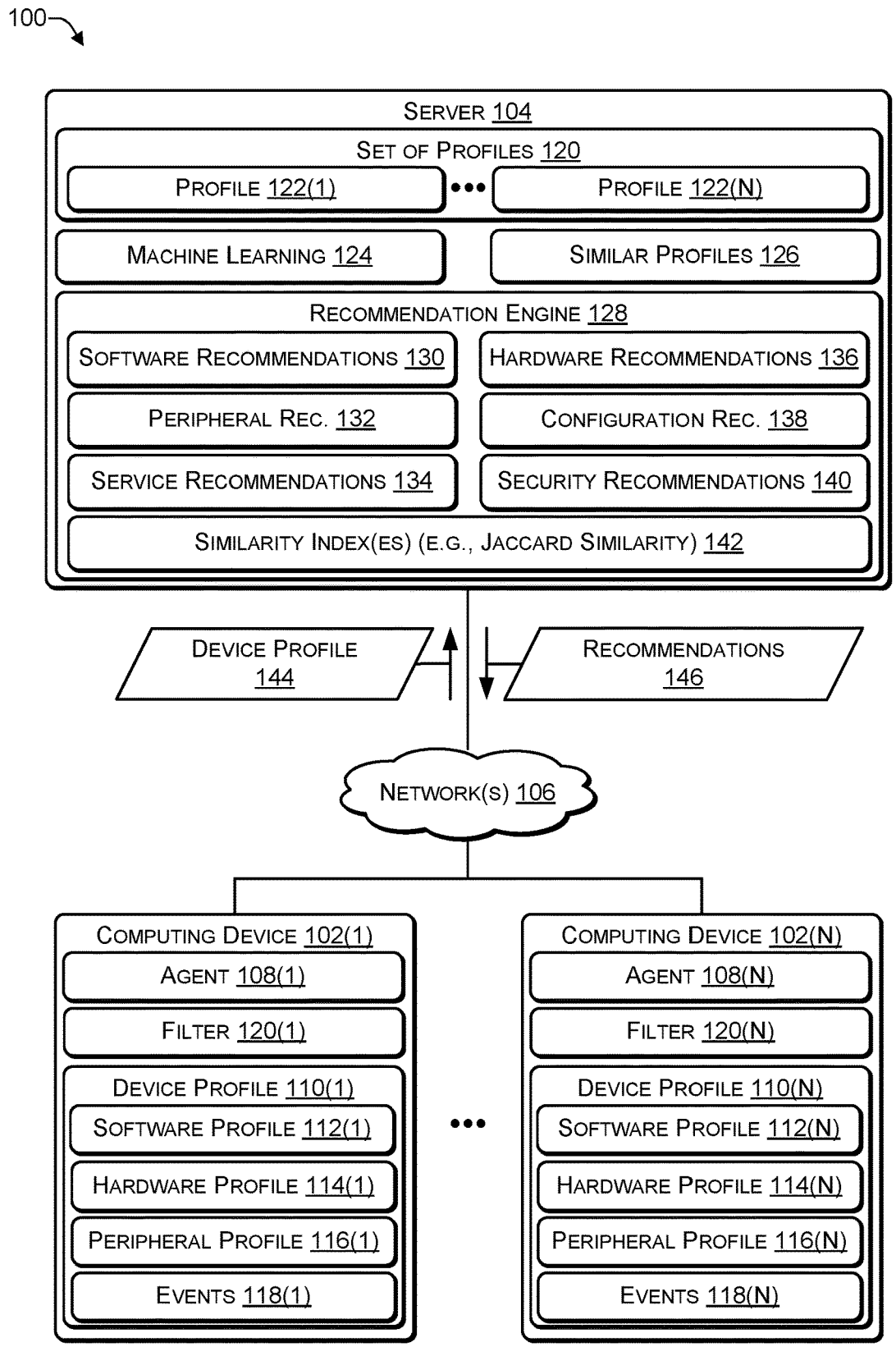
FIG. 1 is a block diagram of a system that includes a computing device sending a device profile to a server and receiving recommendations to configure the computing device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide examples of a system in which an agent on a computing device gathers information about how the software applications and the hardware components of the computing device are being used and creates a device profile based on the gathered information. The agent may send the device profile to a server and receive configuration recommendations to increase throughput, reduce latency, reduce resource usage, reduce power consumption, reduce the time a software application or hardware component takes to perform a particular task, or any combination thereof.

The server may compare the device profile to other device profiles of other computing devices and identify a subset of device profiles that are similar to the device profile of the computing device. For example, the server may determine a similarity measurement, such as, for example, a Jaccard coefficient after comparing the device profile of the computing device with one of the other device profiles. To illustrate, the computing device may include an i7 processor, 8 gigabytes (GB) of random access memory (RAM), and a 256 GB solid state drive (SSD). The device profile may indicate that the software applications that are used include Microsoft® Office® for an average of 2 hours every day and Magix® Vegas® video editor for an average of 1 hour every day. The subset of similar device profiles may include the device profiles associated with computing devices that each have an i7 process (e.g., clock speeds may be ignored), at least 8 GB of RAM, and at least a 256 GB SSD. The similar device profiles may indicate that the corresponding computing devices execute Microsoft® Office® (e.g., the version, such as Office 2007, Office 2010, Office 2013, etc. and the edition, such as Student, Business, Standard, Professional, etc. may be ignored) for at least 1 hour every day and video editing software (e.g., the level, such as Magix® Movie Edit, Movie Studio, Movie Studio Plus, Vegas® Pro, and the like may be ignored) for at least 30 minutes every day.

The server may analyze the subset of device profiles that are similar to the device profile of the computing device to identify differences in the configurations of the similar computing devices that correspond to the similar device profiles. Based on the differences, the server may determine configuration recommendations and send the recommendations to the computing device. The agent may automatically implement at least one recommendation. For example, the computing device may include two disk drives and the operating system may be installed on and access a first (e.g., primary) disk drive. The recommendations may include automatically changing the settings of the video editor to create a buffer (e.g., used for the video file) on a second (e.g., non-primary) disk drive instead of on the first disk drive to avoid both the video editing application and the operating system contending for access to the first disk drive, thereby speeding up video editing operations performed by the video editor. As another example, the recommendations may include automatically updating a driver and/or a firmware of a hardware component (e.g., networking card, optical drive, graphics card, or the like) to reduce the time taken to execute operations that the computing device frequently performs, use less power, and the like.

Some recommendations may not be automatically performed but may be suggested to a user of the computing device. The recommendations may include upgrading existing software (e.g., from one edition to another edition), installing new software, upgrading hardware, and upgrading one or more peripheral devices. For example, the user may be provided with a recommendation to upgrade (e.g., purchase an upgrade) from one particular edition or version of a software application to a newer or more powerful version of the same software application. To illustrate, the recommendations may include upgrading from Office 2007 (older) to Office 2016 (newer), upgrading from Office Student (lower level product) to Office Professional (higher level product), upgrading from Video Studio (consumer-level) to Video Pro Plus (professional-level), or the like because the recommended version executes tasks that the user frequently performs (e.g., according to the device profile) in a shorter period of time. The recommendations from the server may include information indicating the level of improvement, particularly for tasks that the device profile indicates that the computing device performs more than a threshold amount (e.g., more than 20% each day, more than 15 minutes per day, or the like), e.g., "By upgrading from Office 2007 to Office 2016, opening the PowerPoint® application may be reduced from 5 seconds to 2 seconds," or "By upgrading from Video Edit to Video Pro Plus, saving a fifteen-minute video segment in mp4 format may be reduced from 10 minutes to 3 minutes."

The device profile may indicate which software applications are being used regularly (e.g., at least once a day, once a week, or once a month, or the like) within a predetermined time interval, which software applications are being used sporadically within the predetermined time interval, and which software applications are not being used within the predetermined time interval. The device profile may identify how long (e.g., M minutes, where >=0) each software application is being used in the predetermined time interval. The device profile may indicate which hardware components (e.g., main memory, disk drive(s), optical drive(s), ports, temporary central processing unit (CPU) clock speed increase such as turbo boost, and the like) are being used in the predetermined time interval, how long (e.g., P milliseconds) each of the hardware components is being used in the predetermined time interval, and the like. For example, the device profile may indicate that the computing device is a laptop that is frequently used with battery power (e.g., without being plugged into an electrical outlet). The recommendations may include upgrading to a larger battery pack to enable the computing device to be operated on battery power for an extended period of time. The device profile may indicate which peripherals (e.g., printer, scanner, external disk drive, external optical drive, universal serial bus (USB) drive, memory card, monitor(s), and the like) are being used in the predetermined time interval, how long (e.g., Q seconds) each of the hardware components is being used in the predetermined time interval, and the like.

Thus, a manufacturer may install a software agent ("agent") on each computing device (e.g., tablet, laptop, desktop, and the like) that the manufacturer sells or leases. The agent may gather various information, including an original hardware and software configuration of the computing device, modifications to the hardware and software of the computing device, a current hardware and software configuration of the computing device, usage information identifying how the hardware and software installed on the computing device are being used, which peripherals have been used with the computing device, and other information related to the computing device. The gathered information may be filtered to remove personally identifiable information (PII) to preserve the anonymity of the data source. The PII may include financial institution account-related data, such as credit card-related data, bank account related data (e.g., account number, personal identification number (PIN), and the like), address-related data (e.g., house number, street name, zip code, etc.), phone number-related data, social security-related data, and other information that could potentially be used to identify a user of the computing device. The agent may periodically (e.g., at a predetermined time interval) send the gathered information (e.g., telemetry data) to a server (e.g., a cloud associated with the manufacturer.

A device profile (also referred to herein as a usage profile) may include a unique identifier that is associated with each computing device. For example, the unique identifier may include a serial number, a service tag, or other identifier that uniquely identifies the computing device. The device profile may include information identifying which factory or team in a particular factory manufactured the computing device, information identifying the team that validated the computing device, when the computing device was shipped, what hardware and software was originally installed on the computing device when it was shipped from the factory, how the computing device was maintained (e.g., work done under warranty, work done outside the warranty, work done that voids the warranty, remote maintenance where someone remotely connected to the computing device, another type of maintenance, or any combination thereof), which hardware components and software applications were changed, a performance profile (e.g., measurements regarding how many operations can be performed in a particular time period, including computational operations, read/write operations to random access memory (RAM), read/write operations to a disk drive, sending and receiving operations via a particular communications channel (e.g., Wi-FI, Ethernet, Bluetooth® and the like), a power consumption profile (e.g., how much power is consumed each hour of each day, average power consumption per hour, per day, and per week, and the like), and other information related to the computing device's hardware and software usage.

The manufacturer's server (e.g., cloud) may collect the device profiles of multiple devices, e.g., millions of computing devices, and perform assessments about what hardware upgrades, software upgrades, peripheral upgrades, and the like may be performed to improve throughput, reduce power consumption, reduce the time to perform tasks that are frequently performed (e.g., a frequent task may be a task that is performed more than a threshold number of times in a particular time period, more than a threshold percentage of the overall time that the computing device is powered on, or another measurement metric) on the computing device, etc.

The server may perform the assessment of a particular device profile by comparing the particular device profile to other device profiles to identify a subset of device profiles that are similar to the particular device profile. Similar means that the particular device profile may have a similar hardware configuration and a similar usage profile indicating that the hardware and software are being used in a similar manner. The server may determine the subset of similar devices by performing a comparison of the particular device profile with individual ones of the other device profiles and determining a similarity index, such as a Jaccard index, to quantify the similarity. After the server performs the assessment, the server may analyze the device profiles of each device in the subset of similar devices to identify recommendations. By identifying other devices with similar hardware configurations, software configurations, and peripherals, the server may identify hardware, software, and/or peripheral recommendations.

The device profile may identify hardware components and software applications that are currently installed on the computing device, peripheral devices that have been connected to the computing device, when they are plugged in, how long they are plugged in, and the like. The device profile may identify an approximate location of the computing device (e.g., which city, state, country, or the like). For example, the device profile may indicate that a year ago a 1080p monitor was attached to the computing device via a ThunderBolt® port. The device profile may identify which peripheral was attached since the computing device was first manufactured, how often each peripheral is used (daily, weekly, etc.), and how the peripheral is used (e.g., to print, to scan, to fax, etc.). The device profile may identify hardware, software, and peripherals that the manufacturer installed when the device was first built and that was added after the the device was built. In some cases, each hardware component that the manufacturer initially installed may include a unique identifier, such as, for example, an electronic piece part identifier (ePPID). The ePPID may, for example, include a manufacturer's part number, a revision level, a country of origin, a supplier identifier, a date code (e.g., indicating a date of manufacture), a unique sequence number (e.g., sequence in the manufacturing process), other information relating to the hardware component, or any combination thereof. Each ePPID may be associated with a particular service entitlement (e.g., what type of warranty service is associated with the component). For example, if the device profile indicates that a hard drive is failing and is under warranty, the manufacturer may replace the hard drive under warranty. However, if the device profile indicates that user removed the original drive and installed a different drive, then the device profile may detect that drive is failing and may detect that the drive was not the original drive that was installed when the computing device was manufactured and thus the drive is not covered by the manufacturer's warranty.

In some cases, recommendations may be made using software usage profiles. For example, the agent may create a software usage profile associated with a computing device and send the software usage profile to a cloud-based server. The server may compare the software usage profile with other software usage profiles of other computing devices and identify similar usage profiles. The server may perform an analysis of the differences between the software usage profile and the other software usage profiles and make recommendations based on the differences. For example, the software usage profile may indicate that 10 software applications are being used on the computing device. The similar usage profiles of the other computing devices may have between 6 to 8 of the same (or similar) 10 software applications. The server may analyze the similar usage profiles, identify the differences, e.g., software applications that are being used by the other computing devices but are currently not being used by the computing device, and recommend the identified software applications. For example, the other similar devices with similar usage profiles may use a particular software application that is currently not being used on the computing device. The recommendation may include the particular software application.

The agent may create a usage profile associated with a computing device that includes at least hardware usage and software usage and send the usage profile to a cloud-based server. The server may compare the software usage profile with other software usage profiles of other computing devices and identify similar usage profiles. The server may perform an analysis of the differences between the hardware usage profile of the computing device and other hardware usage profiles of the similar usage profiles and make recommendations based on the differences. For example, the software usage profile may indicate that 10 software applications are being used on the computing device. The similar usage profiles of the other computing devices may have between 6 to 8 of the same (or similar) 10 software applications. The server may analyze the similar usage profiles, identify hardware differences, e.g., hardware components that the other computing devices are using to perform the same (or similar) tasks while using less time or less computing resources, and make recommendations based on the hardware differences. For example, the other similar computing devices may have more RAM or use an SSD (instead of a conventional disk drive) to perform the same (or similar) tasks faster. The recommendation may include an offer to purchase a RAM upgrade or an SSD.

As an example, a computing device may include one or more processors and one or more non-transitory computer readable media storing instructions executable by one or more processors to perform various operations. The operations may include determining, at a predetermined time interval (e.g., every second, every minute, every hour, every X number of hours (X>0), every day, every week, every month, or the like), (1) a hardware configuration of the computing device, (2) determining a software profile of individual software application installed on the computing device, (3) determining a hardware profile of individual hardware components included in the hardware configuration, and (4) determining a power device profile identifying an amount of power used by the computing device in a predetermined time interval. The operations may include creating a device profile based at least in part on the hardware profile, the software profile, and the power device profile and sending the power device profile to a server. The operations may include receiving one or more configuration recommendations from the server and automatically (e.g., without human interaction) modifying at least one of (1) the hardware configuration or (2) the software configuration to create a modified computing device. The operations may include determining that a software application installed on the computing device (1) executes faster on the modified computing device as compared to the computing device or (1) uses less of at least one hardware component of the modified computing device compared to the computing device.

The server may include one or more processors and one or more non-transitory computer readable media storing instructions executable by one or more processors to perform various operations. The operations may include receiving, from the computing device, the device profile identifying a usage of (1) software applications and (2) hardware components associated with the computing device. The device profile may include a software profile that identifies one or more software applications that are installed on the computing device, an amount of time that each software application of the one or more software applications is used within a particular time period, and software configuration data associated with each software application of the one or more software applications. The device profile may include a hardware profile that identifies one or more hardware components associated with the computing device, including components included in the computing device and peripheral devices that have been connected to the computing device, an amount of time that each of the one or more hardware components is used within the particular time period, an amount of resource usage associated with each the one or more hardware components within the particular time period, and hardware configuration data associated with each software application of the one or more software applications.

The operations of the server may include performing a comparison of the device profile with other device profiles associated with other computing devices. For example, the software profile of the computing device may be compared with individual software profiles associated with individual computing devices of the other computing devices. The hardware profile of the computing device may be compared with individual hardware profiles associated with individual computing devices of the other computing devices. The operations of the server may include determining, based on the comparison, a similarity index (e.g., a Jaccard index, a simple matching coefficient, a Hamming distance, a Sorensen-Dice coefficient, a Tversky index, or a Tanimoto distance, or similar) of the device profile with the other device profiles and selecting a subset of the other device profiles based at least in part on the similarity index to create a subset of similar device profiles. The operations of the server may include determining one or more configuration differences between the device profile of the computing device and individual device profiles of the subset of similar device profiles, determining one or more configuration recommendations based on the one or more configuration differences, and sending the one or more configuration recommendations to the computing device. For example, the one or more configuration differences may include (i) a software configuration difference between: a software configuration of a software application that is installed on the computing device and the same (or similar) software application installed on at least one device of the subset of the other computing devices, (ii) a hardware configuration difference between: a hardware configuration of a hardware component associated with the computing device and the same (or similar) hardware component included in at least one device of the subset of the other computing devices, or any combination thereof. The configuration recommendations may include a software configuration modification to a software configuration of at least one software application that is installed on the computing device, a hardware configuration modification to a hardware configuration of at least one hardware component that is included in the computing device, a peripheral configuration modification to a peripheral configuration of at least one peripheral device that is associated with the computing device, or any combination thereof. For example, the configuration recommendations may include (1) uninstalling, on the computing device, a currently installed software application, (2) installing, on the computing device, a particular software application, (3) uninstalling, from the computing device, a currently installed hardware component, (4) installing, in the computing device, a particular hardware component, (5) connecting a recommended peripheral device to the computing device, or any combination thereof. In some cases, the computing device may automatically apply at least some of the recommendations to the computing device. For example, the computing device may, after receiving the recommendations from the server, automatically (1) uninstall a currently installed software application, (2) install a particular software application, (3) disable a currently installed hardware component to prevent the hardware component from being used, (4) update a firmware or a driver associated with a particular hardware component, (5) update a firmware or a driver associated with a peripheral device that is connected to the computing device.

FIG. 1 is a block diagram of a system 100 that includes a computing device sending a device profile to a server and receiving recommendations to configure the computing device, according to some embodiments. The system 100 may include multiple computing devices 102 coupled to a server 104 via one or more networks 106. For example, the computing devices 102 may include a computing device 102(1) to computing device 102(N) (where N is greater than 0). The computing devices 102 may include a laptop, a tablet, a desktop, a smart phone, or another type of computing device.

Each of the computing devices 102 may include an agent 108 and a device profile 110. For example, the computing device 102(1) may include an agent 108(1) and a device profile 110(1). The computing device 102(N) may include an agent 108(N) and a device profile 110(N). Each of the device profiles 110 may include a software profile 112, a hardware profile 114, a peripheral profile 116, and events 118. For example, the computing device 102(1) may include the device profile 110(1) that includes a software profile 112(1), a hardware profile 114(1), the peripheral profile 116(1), and events 118(1). The device profile 110(N) may include a software profile 112(N), a hardware profile 114(N), a peripheral profile 116(N), and events 118(N). Each of the software profiles 112 may include information as to an initial set of software applications installed (e.g., by the manufacturer) on the corresponding computing device 102, a set of software applications currently installed on the corresponding computing device, which software applications are being used and which are not used, how frequently each software application is used, and a length of time each software applications is used. For example, the device profile 110(N) may indicate that the computing device 102(N) currently has five software applications installed. Three of the software applications may be used while two of the software applications may not be used. Of the three applications that are used, one application may be used an average of two hours every day while the other two applications may be used an average of less than fifteen minutes per day.

The hardware profile 114 may indicate may include information identifying an initial set of hardware components installed (e.g., by the manufacturer) in the corresponding computing device 102, a set of hardware components currently installed on the corresponding computing device, which hardware components were repaired or replaced under warranty, and usage data associated with each hardware component, such as, for example, an amount of utilization of each hardware component, when each hardware component is used, for how long, and the like. For example, the hardware profile 114(N) may indicate that the computing device 102(N) includes an i7 processor, the turbo boost feature of the processor (e.g., which temporarily increases the clock speed) is used an average of 20 minutes every day, an average throughput of the hard drive is X megabits per second (X>0), that the computing device 102(N) connects to other devices using a wireless connection but the Ethernet® port is not used for connection, the universal serial bus (USB) ports are used 100% of the time while the Thunderbolt® port has never been used, and the like. The peripheral profile 116 may indicate which peripherals are currently connected to the corresponding computing device 102, which peripherals were previously connected to the corresponding computing device 102, when the peripherals are connected, a length of time that the peripherals are connected, how much each peripheral is used when connected, and so on. For example, the peripheral profile 116(N) may indicate that a user plugged a 27" 1080p monitor into the computing device 102 via a High-Definition Multimedia Interface (HDMI) port for a particular period of time on particular days of the week. As another example, the peripheral profile 116(N) may indicate that a printer, a scanner, an external disk drive, or another type of peripheral device was connected to the computing device 102(N) via a USB port on a particular date and is currently still connected to the computing device 102(N).

The events 118 may include various events that have occurred on the computing device 102. For example, the events 118 may include when a software application or operating system crash occurred, logs generated by the software applications (e.g., installation logs, error logs, crash logs and the like), memory dumps created by software applications or by an operating system of the computing device, how many restarts occurred, and whether the restarts were manually initiated, initiated by a particular software application, or initiated by the operating system of the computing device 102.

Each of the computing devices 102 may include a privacy filter 120. For example, the computing device 102(1) may include a filter 120(1) and the computing device 102(N) may include a filter 120(N). The filter 120 may scan the device profile 110 and remove data, such as, for example, personally identifiable information (PII), e.g., information that can be used by itself or in conjunction with other information to identify, contact, or locate one or more users of the corresponding computing device 102. For example, the filter 120 may scan and remove (e.g., filter out) information such as, for example, phone numbers, email addresses, credit card or other financial information (e.g., last four digits of an account number, personal identification number (PIN) number, and the like), and other information that could enable identification of personal information associated with a user of each computing device 102. The filter 120 may be applied before sending one of the device profiles 110 (or at least a portion thereof) to the server 104.

The server 104 may include a set of profiles 120 that include a profile 122(1) to a profile 122(N). Each of the profiles 122 may be associated with one of the computing devices 102. For example, the profile 122(1) may be associated with the computing device 102(1) and the profile 122(N) may be associated with the computing device 102(N). The server 104 may include a machine learning module 124 that uses machine learning (e.g., support vector machine, or other machine learning) to identify similar profiles 126 that are similar to a device profile 144 (e.g., one of the device profiles 110) received from a particular one of the computing devices 102. For example, the machine learning module 124 may compare the device profile 144 with at least a portion of the profiles 122 to identify similar profiles 126, e.g., a subset of the set of profiles 120 that are similar to the device profile 144.

The server 104 may include a recommendation engine 128. The recommendation engine may compare the device profile 144 to the similar profiles 126 to identify differences and make recommendations, including one or more of, for example, software recommendations 130, peripheral recommendations 132, service recommendations 134, hardware recommendations 136, configuration recommendations 138, and/or security profile recommendations 140. The similar profiles 126 may be determined by comparing a device profile (e.g., associated with one of the computing devices 102) with the set of profiles 120 and determining a similarity index 142 (e.g., a Jaccard index, a simple matching coefficient, a Hamming distance, a Sorensen-Dice coefficient, a Tversky index, or a Tanimoto distance, or the like). To create the similar profiles 126 (e.g., a subset of the profiles 122), the recommendation engine 128 may identify particular profiles from the set of profiles 120 that have a similarity index that indicates that the particular profiles are similar to the device profile 144. The recommendation engine 128 may compare the software profile, hardware profile, and peripheral profile of the device profile 144 to the similar profiles 126 to identify one or more of the recommendations 130, 132, 134, 136, 138, and 140. For example, the similar profiles 126 may each have a hardware configuration that is similar (or identical) to the hardware configuration of the device profile 144. The similar profiles 126 may indicate that similar (or identical) software applications are used in a similar (or identical) manner. The computing device associated with the device profile 144 may perform a task in a particular amount of time or using a particular amount of computing resources (e.g., CPU, memory, disk drive, bandwidth, and the like). The similar profiles 126 may indicate that other similarly configured computing devices perform the same (or similar) task faster or using fewer resources (e.g., power, memory space, disk drive space, communications bandwidth, and the like).

The software recommendations 130 may include one or more recommendations to install a particular software application, uninstall a particular software application, or modify a configuration of a particular software application. For example, a user may use a consumer-level video editor on the computing device 102(N) for performing video editing tasks. The recommendation engine 128 may determine that upgrading to a professional-level video application may enable the user to perform the same video editing tasks much faster than using the consumer-level video editor. For example, the user may perform a task that includes converting a video from one format to another format (e.g., to enable the format to uploaded to social media) and this task may take ten minutes of processing for every minute of a video using a consumer-level software application. The recommendation engine 128 may recommendation that the user upgrade from the consumer-level software application (e.g., Video Studio) to a professional-level software application (e.g., Video Pro) that is manufactured by the same manufacturer because the professional-level application may perform the same task in a much shorter period of time, e.g., five minutes of processing for every minute of a video. Many software manufacturers may provide multiple editions or levels for their products, such as, for example, a student-level application (e.g., Microsoft® Office® Student Edition), a consumer-level application (e.g., Microsoft® Office® Home Edition), and a professional-level application (e.g., Microsoft® Office® Business Edition). The software manufacturer may provide low cost options to upgrade from one level to another level to prevent consumers from switching to a product made by a different manufacturer. In some cases, such as when the software recommendation can be performed without paying a fee (e.g., upgrade fee), the agent 108 may automatically (e.g., without human interaction) perform the software recommendation. For example, the user may frequently convert video from one format to another format. The software manufacturer may create a new version of the software that is a free upgrade to existing users that performs the video conversion faster. In such cases, the agent 108 may automatically upgrade the software application to the new version.

The hardware recommendations 136 may indicate one or more hardware modifications that the user can perform to the computing device 102 to reduce resource usage, such as reducing a number of CPU cycles (e.g., decreasing an amount of time taken to perform one or more frequently performed tasks), using less RAM, using less disk space, using less bandwidth, reducing power consumption, or the like. For example, if the user appears to be running out of space on a hard drive, the hardware recommendations 136 may include upgrading to a larger hard drive. As another example, the user may perform a large number of input/output (I/O) operations to the hard drive that consume a large amount of time. The hardware recommendations 136 may include a suggestion to upgrade from a conventional hard disk drive to a solid-state drive (SSD) that is much faster at performing the I/O operations that the user frequently performs. As yet another example, the hardware recommendations 136 may include a recommendation that the user increase an amount of main memory (e.g., random access memory (RAM)) as applications are constantly swapping from memory to disk due to the size of the software applications or due to the size of the files being modified by the software applications. By upgrading from 2 gigabytes (GB) of RAM to 8 GB of RAM, the computing device may perform faster the tasks that the computing device frequently performs. In some cases, such as when the hardware recommendation can be performed without paying a fee (e.g., upgrade fee), the agent 108 may automatically (e.g., without human interaction) perform the hardware recommendation. For example, the hardware recommendations 136 may include updating a hardware driver or updating a firmware of a particular hardware component. In such cases, the agent 108 may automatically download and install a latest version of a particular driver or a particular firmware associated with the particular hardware component.

The recommendation engine 128 may make the peripheral recommendations 132 that recommend replacing a particular peripheral with a different particular peripheral. For example, if the user is scanning many documents, the peripheral recommendations 132 may include a recommendation to upgrade to a multi-document scanner rather than a single sheet scanner to reduce the amount of time to scan multiple pages of a document. As another example, the peripheral recommendations 132 may include a recommendation to upgrade to a newer scanner (e.g., that uses newer technology) that is able to scan a document faster than the current scanner (e.g., that uses older technology). In some cases, such as when the peripheral recommendation can be performed without paying a fee (e.g., upgrade fee), the agent 108 may automatically (e.g., without human interaction) perform the peripheral recommendation. For example, the peripheral recommendations 132 may include updating a hardware driver or updating a firmware of a particular peripheral component (e.g., printer, scanner, external drive, or the like). In such cases, the agent 108 may automatically download and install a latest version of a particular driver or a particular firmware associated with the particular peripheral component.

The service recommendations 134 may include one or more recommendations related to servicing the computing device. For example, if the device profile indicates that a hardware component is failing (e.g., hard drive is failing) or is subject to a recall notice (e.g., battery pack overheating), then the service recommendations 134 may include a recommendation to have the computing device 102 serviced. The service recommendations 134 may indicate whether the service is covered under warranty or whether there is a fee for the service.

The configuration recommendations 138 may include recommendations for reconfiguring one of the computing devices 108 to improve throughput, reduce resource usage, reduce the time taken to perform commonly-performed tasks, and the like. For example, the computing device 102(N) may include two disk drives, a first drive on which the operating system is installed and a second drive. The configuration recommendations 138 may include changing the options associated with a software application to create temporary files on the second drive to avoid contending with the operating system to access the first drive. For example, a video editing software application may create a temporary file on a disk drive and the default disk drive may be the first drive on which the operating system and the software application are installed. The operating system may access system files on the first drive and other software applications may create and access temporary files on the first drive. The video editor may thus contend with the operating system and other applications to access the first drive. By moving the creation of temporary files from the first disk drive to a second disk drive, the software application can access the second disk drive without contention, thereby speeding up disk-related operations. As another example, the configuration recommendations 138 may include recommendations to modify the basic input/output system (BIOS) of the computing device 102. For example, modifying one or more options in the BIOS may enable read and write operations to the disk drives to be performed faster. The configuration recommendations 138 may include recommendations on configuring various operating system parameters to enable tasks that the computing device 102 performs frequently to be performed faster and/or to use less resources (e.g., CPU, memory, disk drive, power, and the like). As yet another example, the configuration recommendations 138 may include a recommendation to plug a USB 3.0 compatible peripheral into a USB 3.0 port rather than a USB 2.0 port to take advantage of the faster throughput of USB 3.0. As a further example, if the user is frequently printing documents, the configuration recommendations 138 may include configuration recommendations to enable the printer to print pages faster, such as, for example, setting the printer to a draft mode or a lower resolution print mode to enable faster printing and to use less ink (e.g., thereby enabling the toner to last longer).

The security recommendations 140 may include recommendations on managing security on the computing device 102. For example, the security recommendations 140 may include elevating privileges for a particular set of users, reducing privileges for a particular set of users, or making other modifications to user privileges of one or more users associated with one of the computing devices 102.

In some cases, the recommendations 146 may be based in part on the software profiles 112. For example, the agent 108(N) may create the software usage profile 112(N) associated with the computing device 102(N) and send the usage profile 144 to the cloud-based server 104. The server 104 may compare the software usage profile 144 with the set of (software usage) profiles 120 of other computing devices and identify the similar usage profiles 126. The server 104 may perform an analysis of the differences between the software usage profile 144 and the set of software usage profiles 120 and, based on the differences, make the recommendations 146. For example, the software usage profile 144 may indicate that 10 software applications are being used on the computing device 102(N). The similar usage profiles 126 of the other computing devices may have between 6 to 8 of the same (or similar) 10 software applications. The server 104 may analyze the similar usage profiles 126, identify the differences, e.g., software applications that are being used by the other computing devices associated with the similar profiles 126 but are currently not being used by the computing device 102(N), and recommend the identified software applications. For example, the other similar devices with the similar usage profiles 126 may use a particular software application that is currently not being used on the computing device 102(N). The recommendations 146 may include a recommendation to install the particular software application.

The agent 108(N) may create the usage profile 110(N) associated with the computing device 102(N) that includes at least hardware usage (e.g., hardware profile 114(N)) and software usage (e.g., software profile 112(N)) and send the usage profile 144 to the cloud-based server 144. The server 104 may compare the software usage profile 112(N) with other software usage profiles of other computing devices in the set of profiles 120 to identify the similar profiles 126. The server 104 may perform an analysis of the differences between the hardware usage profile 114(N) of the computing device and other hardware usage profiles of the similar profiles 126 and make recommendations based on the differences. For example, the software usage profile 112(N) may indicate that 10 software applications are being used on the computing device 102(N). The similar usage profiles of the other computing devices may have between 6 to 8 of the same (or similar) 10 software applications. The server 104 may analyze the similar usage profiles, identify hardware differences, e.g., hardware components that the other computing devices are using to perform the same (or similar) tasks while using less time or less computing resources, and make hardware recommendations 136 based on the hardware differences. For example, the other similar computing devices may have more RAM or use an SSD (instead of a conventional disk drive) to perform the same (or similar) tasks faster. The recommendations 146 may include a recommendation and an offer to purchase a RAM upgrade or an SSD.

Thus, each of the computing devices 102 may have an agent 108 that gathers information about the software configuration, the hardware configuration, and peripherals associated with the computing device 102 and how they are being used. For example, the agent 108 gather information about which applications are installed, which applications are being used, how long each application is being used, tasks that each application is performing, and the like. The agent 108 may keep track of various events 118 that occur on the computing device 102. The agent 108 may create the device profile 110 that includes the software profile 112, the hardware profile 114, the peripheral profile 116, and the events 118. The agent 108 may gather information on software usage, hardware usage, peripheral usage, and events at a predetermined time interval and/or when an event occurs or when usage of a software application, hardware component, or peripheral is detected and update the device profile 110.

After the agent 108 has gathered the information, the agent 108 may apply a filter 120 to the information in the device profile 110 to filter out PII that could potentially be used to identify a user of the computing device 108. For example, the filter 120 may be used to remove personally identifiable information (PII) from the device profile 110. The filter 120 may, for example, remove information such as telephone numbers, street addresses, legal names, credit card information, insurance information, social security information, or other confidential information.

After the agent 108 has applied the filter 120 to the information in the device profile 110, the agent 108 may send device profile 144, e.g., one of the device profiles 110(1) to 110(N), to the server 104. The server 104 may compare the device profile 144 with other profiles from the set of profiles 120. For example, if the device profile 144 is associated with the computing device 102(N), then the device profile 144 (e.g., the device profile 110(N)) may be compared to at least some of the profiles 122(1) to 122(N-1) corresponding to the computing devices 102(1) to 102(N-1). The comparison may be performed by a software component executing on the server 104, such as the machine learning module 124. The machine learning module 124 may identify the similar profiles 126 that include profiles from the set of profiles 120 that are similar to the device profile 144 in terms of hardware components, software applications, the way in which the software applications are used, peripherals and peripheral usage, and other related information. The recommendation engine 128 may analyze the similar profiles 126 to identify recommendations that can be provided to improve a performance of commonly performed tasks. For example, assume the computing device 102(N) sends the device profile 144 to the server 104, and the recommendation engine 128 determines that the computing device 102(1) is similar to the computing device 102(N). The recommendation engine 128 may determine that the computing device 102(1) is similar to the computing device 102(N), e.g., the software profile 112(1) is similar to (or the same as) the software profile 112(N), the hardware profile 114(1) is similar to (or the same as) the hardware profile 114(N), the peripheral profile 116(1) is similar to (or the same as) the peripheral profile 116(N), the events 118(1) are similar to (or the same as) the events 118(N), or any combination thereof. For example, the recommendation engine 128 may determine that the same software application is installed on both the computing device 102(1) and the computing device 102(N), but the software application executes a particular task faster on the computing device 102(1) than the computing device 102(N). The recommendation engine 128 may analyze the device profile 110(1) and determine that the reason why the software application executes faster is because the computing device 102(1) has an SSD for the main drive whereas the computing drive 102(N) has a conventional hard disk drive. In this example, the recommendations 146 provided by the recommendation engine 128 may include a recommendation that the computing device 102(N) be upgraded from the conventional disk drive to an SSD. As another example, the recommendation engine 128 may determine that the computing device 102(1) has twice the main memory (RAM) as the computing device 102(N) resulting in a particular software application executing faster on the computing device 102(1) as compared to the computing device 102(N). The recommendation engine 128 may make a hardware recommendation 136 that the computing device 102(N) be upgraded to increase the amount of RAM in the computing device 102(N), e.g., from 2 GB to 4 GB, from 4 GB to 8 GB or from 8 GB to 16 GB.

To manage a large number (e.g., millions) of the profiles 122 having a large number of unique software applications (e.g., hundreds), the server may create a matrix identifying which software applications are installed on which of the computing devices 102. The server 104 may process the matrix to better manage the sparse nature of the matrix. For example, the number of application names may be reduced by selecting a particular language (e.g., Latin) encoding, removing foreign language characters, converting all characters to a single case (e.g., all lower case or all upper case), removing punctuation, removing edition information (e.g., student edition, home edition, business edition), and removing version numbers (e.g., the year in Office® 2003, Office® 2010, and the like may be removed). The server 104 may process the matrix to remove applications that are unlikely to be recommended for purchase (e.g., applications that have been abandoned and are no longer supported). The server 104 may process the matrix to remove software applications that are infrequently used (e.g., used less than X times in Y days). The server 104 may process the matrix to consolidate based on application names. For example, Office® Professional, Office® Professional Plus, Office® Professional Edition, Office® Student Edition, Office® Home Edition, Office® Small Business Edition, and the like may be merged into a single software suite, e.g., Office®.

The recommendation engine 128 may determine a similarity index 142 when comparing the device profile 144 with profiles in the set of profiles 120 to identify the similar profiles 126. For example, assume one of the computing devices 102 is uniquely identified by a service tag or serial number Si and has a set of M software applications, where 6>M>0.

Si={a1, a3}
Sj={a2, a3, a5}

In this example, device Si has applications a1 and a3, installed but does not have applications a2, a4, and a5. Device Sj has applications #2, #3, and #5, installed but does not have applications #1 and #4.

A similarity index, such as a Jaccard similarity, may be determined between Si and Sj as $$j_{ij} = \frac{|S_i \cap S_j|}{|S_i \cup S_j|}.$$

The similarity index may be determined for each pair of devices and stored in a similarity matrix as illustrated by Table 1 below:

TABLE 1

|  | Device S1 | Device S2 | Device S3 | Device S4 | Device S5 |
|---|---|---|---|---|---|
| Device S1 | 1 | j | j | j | j |
| Device S2 | j | 1 | j | j | j |
| Device S3 | j | j | 1 | j | j |
| Device S4 | j | j | j | 1 | j |
| Device S5 | j | j | j | j | 1 |

The machine learning model 124 may be trained using training data to enable the machine learning model 124 to determine what amount of j indicates a similarly equipped device.

Using the similarity matrix of Table 1, for a given service tag (or serial number) that uniquely identifies a computing device, the server 104 may search for service tags such that:

$$S_x \in \text{Select\_taglist if } j_{(selected\_tag,x)} <= T$$

In the above equation, T is the threshold for Jaccard similarity. After the identities (e.g., service tags or serial numbers) of similar devices have been identified, the applications to recommend may be determined as follows:

$$(S_x \cup S_{selected}) - (S_x \cap S_{selected})$$

The above example illustrates how the server 104 may determine software application recommendations. A similar process may be used to determine hardware component recommendations, peripheral recommendations, configuration recommendations, and other types of recommendations.

Thus, an agent on a computing device may create a device profile that includes software applications that were originally installed, currently installed software applications, which software applications are used, when, and for how long, hardware components that were originally installed, currently installed hardware components, which hardware components are used, when, and for how long, peripherals that have been or are currently connected, when they are used, how they are used, how much power is consumed, what events have taken place (e.g., application crashes, restarts, etc.), and the like. The device profile may include information describing the device, such as, for example, a system configuration, a unique identifier (e.g., serial number or service tag), current location, location where the device was manufactured, order data, shipping data, and the like. The device profile may include information about what peripherals are currently attached, which peripherals were previously attached, software that is currently installed, and the like. The device profile may information about how the hardware, software, and peripherals are being used, such as, for example, utilization by application, peripheral device usage profiles, overall system usage profile, and the like.

The agent may periodically (e.g., at a predetermined time interval) send the device profile to a server (e.g., cloud). The server may compare the device profile with other device profiles of other computing devices to identify a subset of similar device profiles. The server may analyze the similar device profiles to determine recommendations (e.g., based on the similar device profiles) to reduce the time taken to perform tasks that the computing device frequently performs. For example, frequently performed tasks may include tasks that are performed at least for a predetermined time period (e.g., at least 5 minutes) or at least a predetermined percentage of the time (e.g., at least 10% of the time that the device is used). The server may send the recommendations to the computing device. In some cases, the agent may automatically implement at least one of the recommendations. In other cases, the agent may display the recommendations along with an incentive (e.g., discount coupon, bonus reward points or the like) to purchase one or more of the recommended products (e.g., hardware, software, peripherals, or the like).

Figure 2:
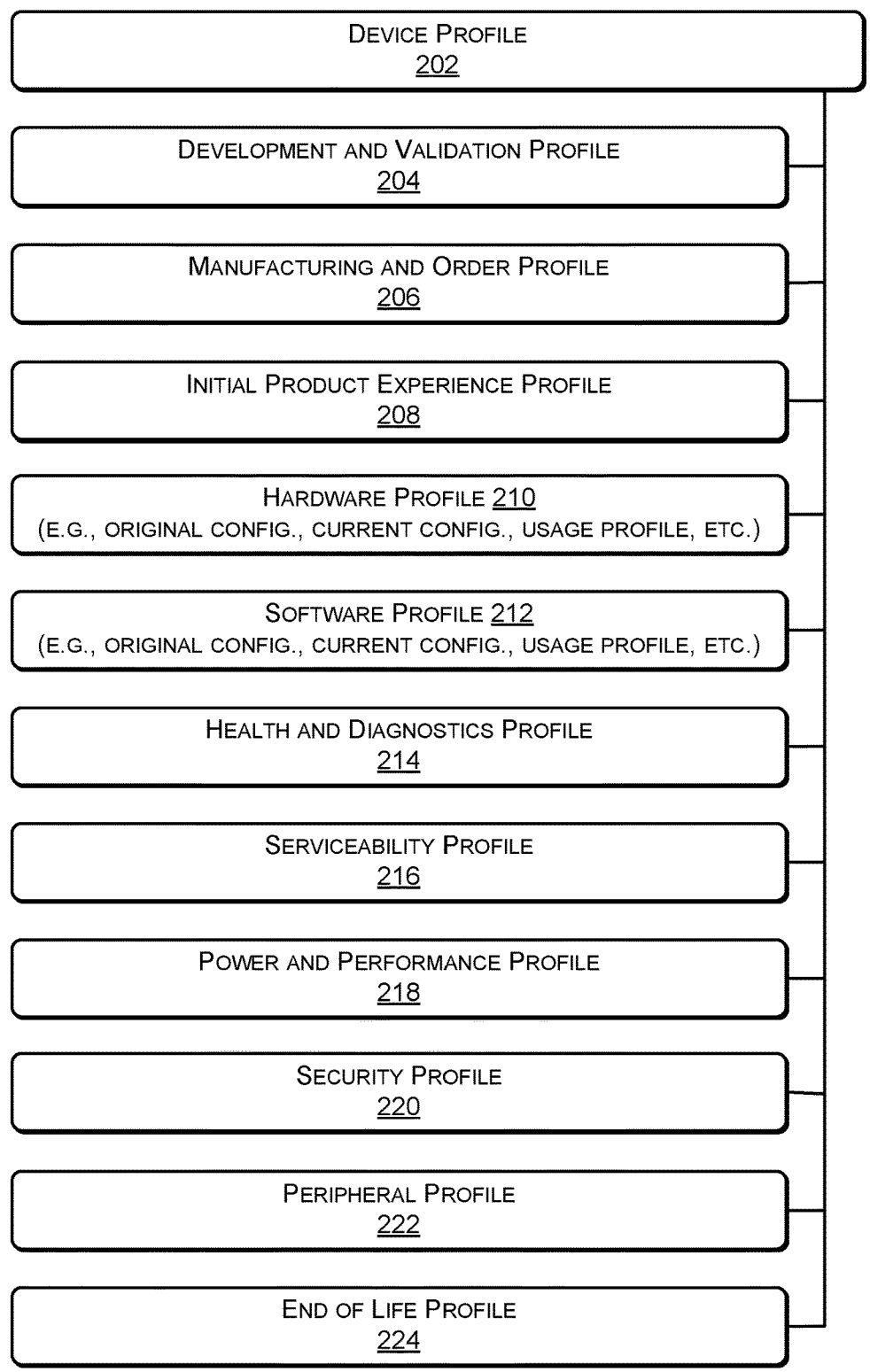
FIG. 2 is a block diagram illustrating a device profile, according to some embodiments.

FIG. 2 is a block diagram 200 illustrating a device profile, according to some embodiments. A device profile 202 (e.g., one of the device profiles 110 of FIG. 1) may include a development and validation profile 204, a manufacturing and order profile 206, an initial product experience profile 208, a hardware profile 210, a software profile 212, a health and diagnostics profile 214, a service ability profile 216, a power and performance profile 218, a security profile 220, a peripheral profile 222, an end of life profile 224, or any combination thereof.

The development and validation profile 204 may include information such as, for example, an identity of the development team, and identity of the validation team, when the product was developed, a validation report (e.g., which tests the device passed, which tests the device failed, and the like), bugs that were allowed to pass through, and other validation-related information.

The manufacturing and order profile 206 may include information as to which factory manufactured the computing device and whether the computing device was a build to order (BTO) device or build to stock (BTS) device. The manufacturing and order profile 206 may include burn in results, a customer name if the device was part of a bulk acquisition (e.g., lease or purchase) from a large customer (e.g., an enterprise customer), and a segment associated with the computing device. For example, many computing manufacturers make computers for different segments, such as a student segment, a consumer segment, a gaming segment, an enterprise segment, a workstation segment, a data center (e.g., server) segment, and the like. The manufacturing and order profile 206 may identify a sales channel, such as whether the sale was through: a national brick and mortar retailer, an internet retailer, a salesperson, the manufacturer's website on the internet, an enterprise portal, a small business portal, or other sales channel. The manufacturing order profile 206 may include information on the way (e.g., by air, by ground, expedited, etc.) in which the computing device was shipped, when the device was shipped, and entitlements (e.g., service entitlements and digital entitlements). For example, the service entitlements may include a type of warranty on various components of the computing device and the digital entitlements may include a software warranty on various software components installed on the computing device.

The initial product experience profile 208 may include information on which data (e.g., drivers, applications, and the like) the user downloaded, whether the user provided a review on the manufacturer's website for the computing device, and other information related to the initial experience for the user after the user received the product.

The hardware profile 210 may include information such as the original hardware configuration of the computing device as it was shipped from the manufacturer, changes made to the computing device, a current configuration of the computing device, and a hardware usage profile describing how the current hardware components are being used. For example, the user may have replaced a factory installed CD-ROM drive with a DVD-Read/Write drive and the hardware profile 210 may reflect the changes to the hardware. The hardware profile 210 may include changes to the hardware made under warranty. For example, if a particular component had a high failure rate, the manufacturer may have replaced the component with a different component under warranty. To illustrate, a battery pack that was determined to get too hot may have been replaced under warranty.

The software profile 212 may include information about software applications and an operating system that were installed on the computing device before the computing device was shipped to the user. The software profile 212 may include information on additional software applications that were installed on the computing device after the device was shipped and whether any of the originally installed software applications were removed. The software profile 212 may include information on how the currently installed software applications are being used, e.g., how frequently (e.g., every day, every week, etc.) each of the software applications are being used, how long (e.g., 10 minutes, 20 minutes, 30 minutes, and the like) each of the software applications are being used each time the software is used, what tasks are being performed by each of the software applications, and other usage-related information.

The health and diagnostics profile 214 may include information, such as various diagnostic logs, various alerts issued by software applications or by the agent, and other information related to health and diagnostics associated with the computing device.

The serviceability profile 216 may include information on the serviceability of the computing device including whether the device has been serviced and how often it has been serviced.

The power and performance profile 218 may include information on how the computing device consumes power and the type of performance (e.g., based on one or more benchmarks) that the computing device delivers. For example, the power may include whether the power profile is to conserve as much power as possible by turning off components that are not being used or whether the power profile is a server-like profile in which all components are always on (e.g., never turned off) regardless of whether they are being used or not. The performance portion of the power and performance profile 218 may include information on the type of performance that the computing device provides, such as, for example, how many instructions the processor can execute in a particular period of time, data input/output, memory input/output, bandwidth (e.g., via Ethernet, Wi-Fi, and the like), etc.

The security profile 220 may include how many different users log into the computing device, how (e.g., method by which) the users are authenticated, the BIOS settings, system management tools, and various other authentication-related information. For example, the methods of authentication may include the user providing a user name and password, or providing biometric information such as, for example, a fingerprint scan, a retinal scan, or facial scan.

The peripheral profile 222 may include a list of peripherals that have been connected to the computing device, the method of connection (e.g., what type of port was used), and information about when and how long the peripheral was connected. The end of life profile 224 may include information such as, for example, an extended entitlement, a lease return service tag, a return depot log, or other information indicating what happened when the lease was up or when the product was returned to the manufacturer for recycling.

Figure 3:
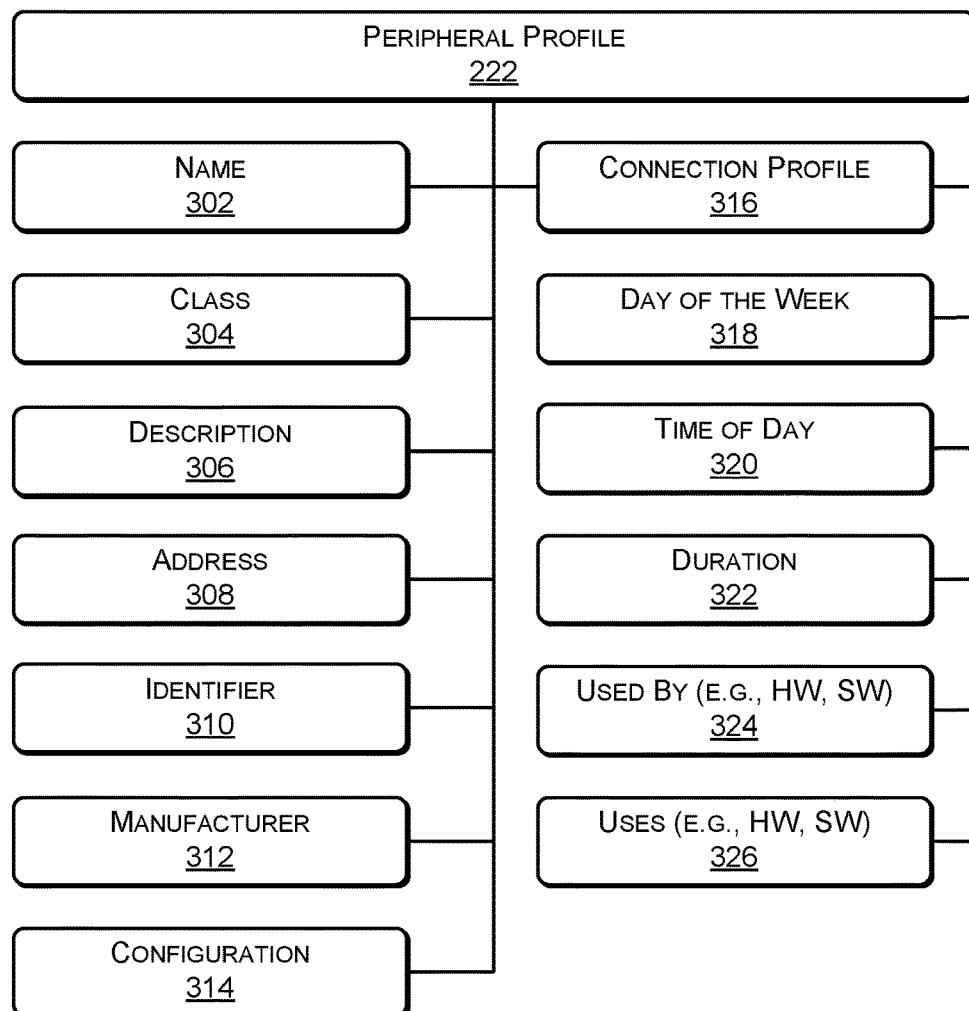
FIG. 3 is a block diagram illustrating a peripheral profile, according to some embodiments.

FIG. 3 is a block diagram 300 illustrating a peripheral profile, according to some embodiments. The peripheral profile 222 may include various information about which peripherals have been connected to the computing device, when they were connected, how long they were connected, and the like. For example, the peripheral profile 222 may include a name of the peripheral 302, a class of the peripheral 304, a description of the peripheral 306, an address of the peripheral 308, an identifier of the peripheral 310, a manufacturer of the peripheral 312, a configuration of the peripheral 314.

The name 302 may indicate a name of the peripheral such as printer, scanner, monitor, or another name. For example, devices that are set up and configured in a similar manner may be grouped together into a particular type of class. The description 306 may include a description as to what function the particular peripheral performs. For example, a printer may be described as printing documents. A scanner may be described as scanning documents. An external monitor may be described as displaying content output from a particular port of the computing device.

The address 308 may indicate a particular address, such as an internal port address. The identifier 310 may include a unique identifier, such as a serial number, service tag, or other type of unique identifier. The manufacturer 312 may identify a manufacturer of the peripheral.

The configuration 314 may include configuration information associated with a peripheral. For example, the configuration 314 associated with the printer may indicate whether the printer is configured to print at the highest possible resolution, whether the printer is configured for toner saver, whether the printer is configured to print in draft mode, etc.

The peripheral profile 222 may include a connection profile 316. The connection profile 316 may indicate when and how often a particular peripheral is connected to the computing device. For example, the connection profile 316 may include a day of the week 318 during which the peripheral was connected, a time of day 320 at which the peripheral was connected, a duration 322 of the connection, a used by 324, and a uses 326. The used by 324 may indicate which hardware components and/or software applications are used by the particular peripheral. For example, an editing program that enables a user to touch up a scanned image may be used by a scanner. As another example, an external hard drive peripheral may be used by a backup software application to backup portions of the data on the computing device. The uses 326 may indicate which hardware components and/or software applications the peripheral uses. For example, the scanner may use a particular driver for scanning and send the scan to a particular software application for editing. The uses 326 may include information such as which port (e.g., USB 2.0, USB 3.0, USB-C, ThunderBolt®, and the like) the peripheral connects through and the throughput of the port.

Figure 4:
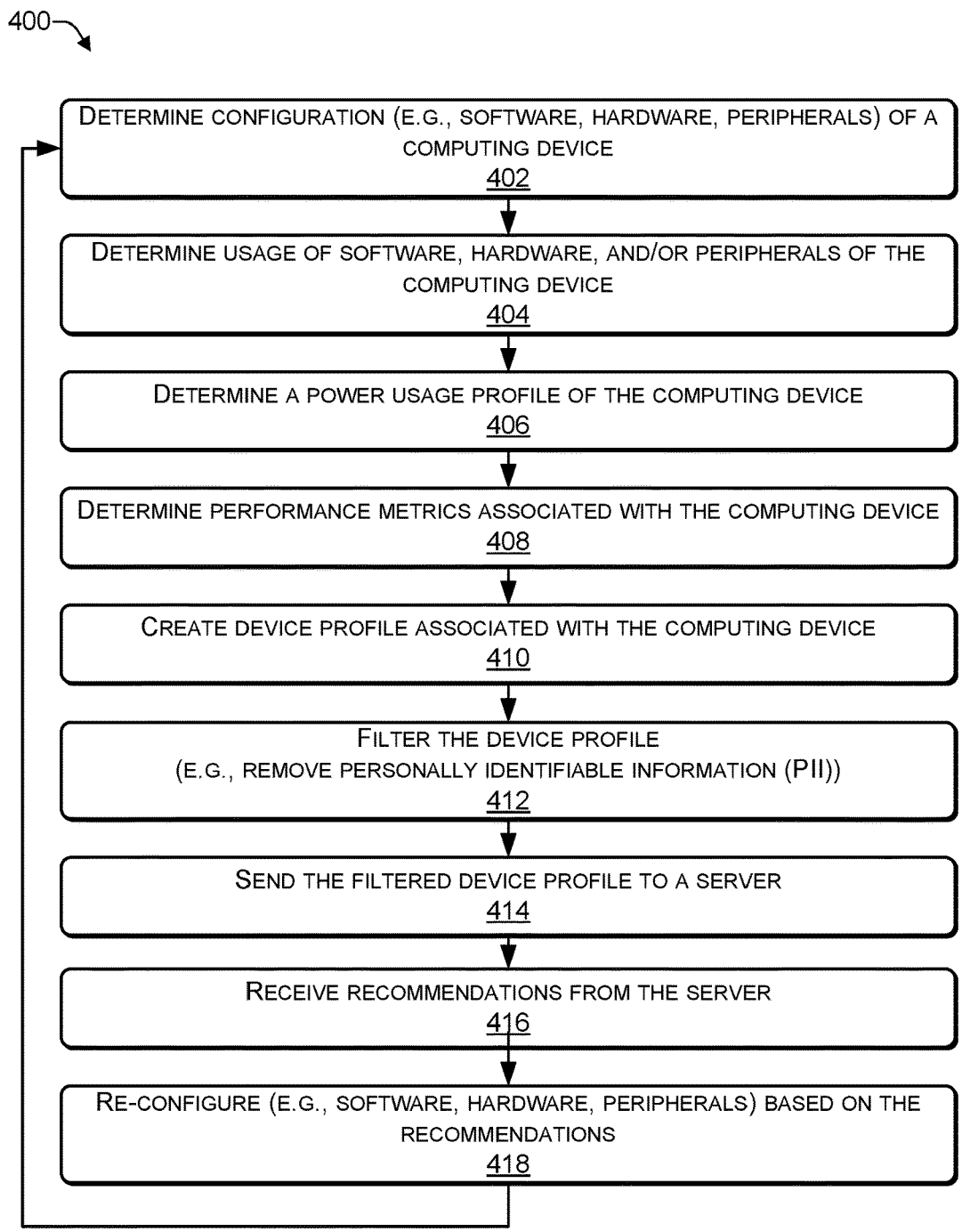
FIG. 4 is a flowchart of a process that includes sending a device profile to a server according to some embodiments.
Figure 5:
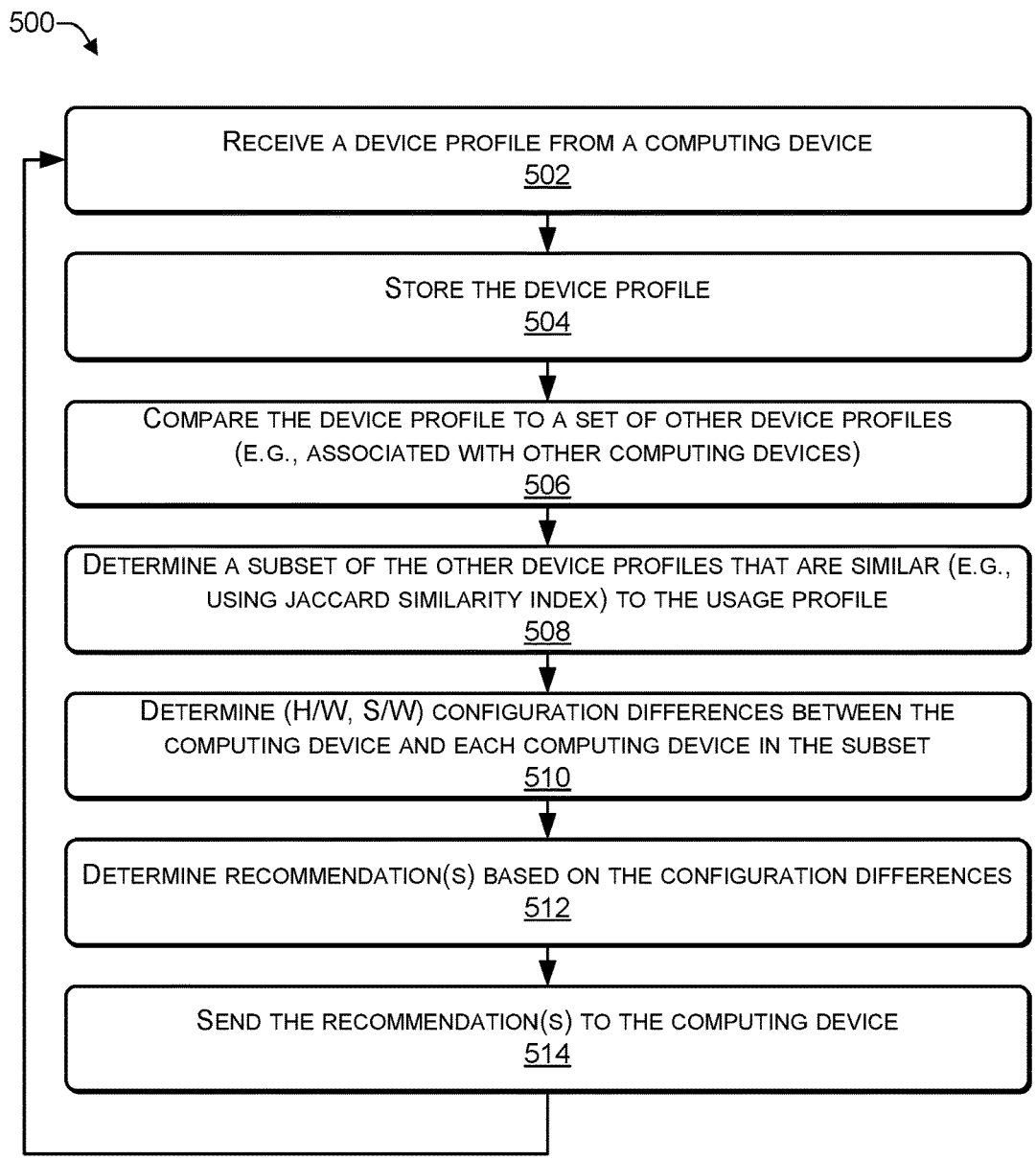
FIG. 5 is a flowchart of a process that includes sending a recommendation to a computing device according to some embodiments.

In the flow diagrams of FIG. 4 and FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3, as described above, although other models, frameworks, systems and environments may be used to implement this process.

FIG. 4 is a flowchart of a process 400 that includes sending a device profile to a server according to some embodiments. The process 400 may be performed by an agent, such as one of the agents 108 of FIG. 1.

At 402, the agent may determine a configuration (e.g., software, hardware, and/or peripherals) of a computing device. At 404, the agent may determine usage data associated with the software applications, the hardware components, and/or the peripherals of the computing device. For example, in FIG. 1, the agent 108 may determine the hardware configuration associated with the computing device 102. The agent 108 may determine the software applications installed on the computing device 102, when they are used, and how often they are used. For example, some software applications may be installed on the computing device 102 but may not be used. As another example, some applications may be used regularly while some applications may only be used occasionally. The agent 108 may determine usage data associated with the computing device's hardware. For example, the agent 108 may determine which hardware components are used most frequently, which hardware components are used less frequently, and which hardware components are unused. For example, if there is a significant amount of input/output being performed with a hard drive, the agent 108 may determine that the hard drive is receiving a significant amount of use. As another example, a computing device such as a laptop may use wireless connectivity (e.g., Wi-Fi® and Bluetooth®), resulting in the Ethernet port being unused. The agent may determine a usage of peripheral devices, such as which types of devices are connected to the computing device, when they are used, how long they are used, which software and/or hardware components the peripheral devices use and which software applications and hardware components make use of the peripheral devices.

At 406, a power usage profile of the computing device may be determined. For example, in FIG. 1, the agent 108 may determine whether various components of the computing device 102 are put into a low-power mode (e.g., standby or a sleep mode) if no user-initiated tasks are being performed for more than a particular period of time. The agent 108 may determine whether the hardware components remain on regardless of whether they are used or not.

At 408, the agent may determine performance metrics associated with the computing device. For example, if the CPU has a turbo mode where the CPU temporarily increases the clock speed to improve throughput, the agent 108 may determine how often turbo mode is used. For example, the server 104 may determine that a CPU of the computing device 108 is frequently going into turbo mode and recommend that the user upgrade to a computing device that has a processor with a faster clock speed.

At 410, the agent may create a device profile that is associated with the computing device. For example, in FIG. 1, the agent 108 may create the device profile 110 that includes one or more of the software usage profile 112, the hardware used profile 114, the peripheral usage profile 116, and the events 118.

At 412, the device profile may be filtered (e.g., to remove PII). At 414, the filtered device profile may be sent to a server. For example, in FIG. 1, the agent 108 may use the filter 120 to remove PII and any other information that could be used to identify the user of the computing device, such as legal name, credit card information, phone numbers, addresses, or other information that could lead to identifying a user of a computing device. After filtering the usage profile 110 using the filter 120, the agent 108 may send the usage data 144 to the server 104.

At 416, recommendations may be received from the server. At 418, one or more of software, hardware, or peripherals may be reconfigured at least in part based on the recommendations received from the server. For example, in FIG. 1, after the agent 108 has sent the usage data 144 to the server 104, the server 104 may send the recommendations 146. The recommendations 146 may be based on other computing devices that have similar hardware and/or software configurations and that have similar software application usage. The recommendations may be based on identifying similar device profiles (associated with similar computing devices) that have similar (or the same) software applications that perform similar (or the same) tasks that the computing device frequently performs and determining that at least one of the similar computing devices performs the tasks more efficiently, such as, for example, completing the tasks in a shorter period of time or using fewer resources compared to the computing device that sent the usage data 144. The server 104 may identify, using machine learning, the differences between the computing device and the faster performing similar device(s).

The recommendations 146 may be based on the differences (e.g., in hardware, software, configuration, and the like) between the computing device and the faster performing similar device(s). For example, the differences may include differences in a device driver, firmware, or configuration of a hardware component, differences in a version, edition, or configuration of a software component, differences in a device driver, firmware, or configuration of a peripheral, and the like. By implementing the recommendations 146, the computing device 102 may be able to perform tasks faster, use less resources, and the like. The agent may automatically (e.g., without human interaction) perform one or more of the recommendations 146, such as, for example, (1) downloading and installing a different driver, newer firmware, or a newer software version, (2) reconfiguring a software application, a hardware component, or a peripheral, and the like. The agent may offer recommendations to purchase software upgrades, hardware upgrades, newer peripherals, and the like.

FIG. 5 is a flowchart of a process 500 that includes sending a recommendation to a computing device according to some embodiments. For example, the process 500 may be performed by the server 104 of FIG. 1.

At 502, a device profile may be received from a computing device. At 504, the device profile may be stored. At 506, the device profile may be compared to a set of other device profiles associated with other computing devices. At 508, a subset of the other device profiles that are similar to the device profile of the computing device may be determined. For example, in FIG. 1, the server 104 may receive the usage data 144 from the computing device 102(1). The server for 104 may compare the usage data 144 with at least some of profiles from the profiles 122(2) to the profile 122(N). The server 104 may the machine learning module 124 to identify the similar profiles 126 from the set of profiles 120. For example, the recommendation engine 128 may determine the similar profiles 126 based on calculating the similarity index 142 between the usage data associated with the computing device 102(1) and individual profiles 122 in the set of profiles 120.

At 510, configuration differences between the computing device (associated with the device profile that was received by the server) and each of the similar computing devices in the subset (e.g., the similar profiles 126) may be determined. At 512, one or more recommendations may be determined based on the configuration differences. At 514, the recommendations may be sent to the computing device. For example, in FIG. 1, the server 104 may determine configuration differences between the usage data 144 and the similar profiles 126 to identify configuration differences that enable the similar computing devices (associated with the similar profiles 126) to execute similar (or identical) tasks that the computing device 102(1) performs but faster and/or with less resource usage. The recommendation engine 128 may determine various recommendations including software recommendations 130, peripheral recommendations 132, system profile recommendations 134, hardware recommendations 136, configuration recommendations 138, security profile recommendations 140, or any combination thereof and send the recommendations 146 to the computing device 102

Figure 6:
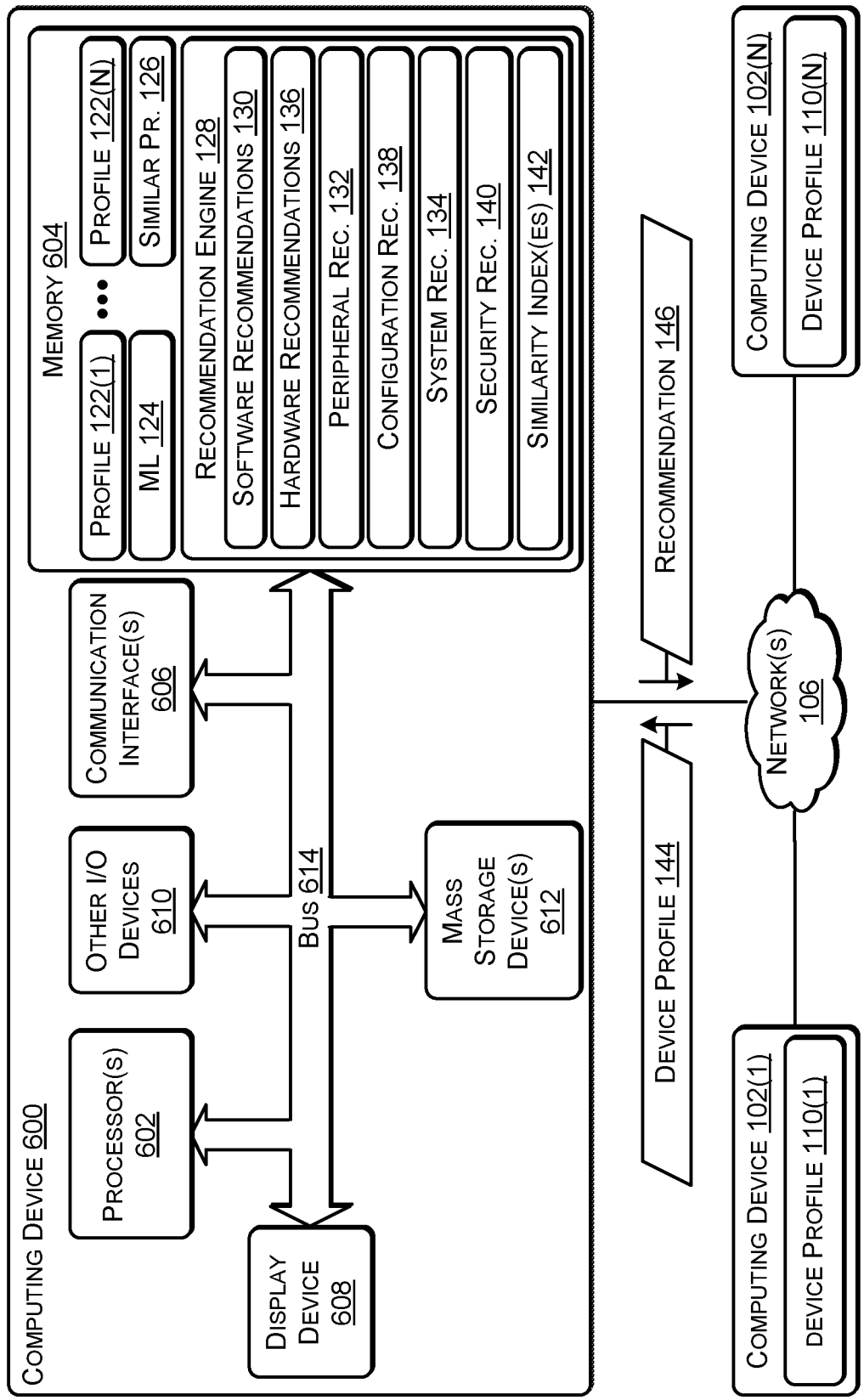
FIG. 6 illustrates an example configuration of a computing device that can be used to implement the systems and techniques described herein.

FIG. 6 illustrates an example configuration of a computing device 600 that can be used to implement the systems and techniques described herein, such as for example, the computing devices 102 and the server 104 of FIG. 1. As an example, the computing device 600 is illustrated in FIG. 6 as implementing the server 104 of FIG. 1.

The computing device 100 may include one or more processors 602 (e.g., CPU, GPU, or the like), a memory 604, communication interfaces 606, a display device 608, other input/output (I/O) devices 610 (e.g., keyboard, trackball, and the like), the sensors 206, and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the profiles 122, the machine learning module 124, the similar profiles 126, and the recommendation engine 128.

Thus, an agent on each of the computing devices 102 may create the corresponding device profile 110 that identifies (1) software applications that were originally installed, currently installed software applications, used and unused software applications, when, and for how long the software applications are used, software edition, and software version, (2) hardware components that were originally installed, currently installed hardware components, which hardware components are used, when, and for how long, firmware version, and driver version, (3) peripherals that have been or are currently connected, when they are used, how they are used, how much power is consumed, (4) performance metrics (e.g., CPU throughput, memory throughput, disk throughput, wired communication throughput, wireless throughput, and the like), what events have taken place (e.g., application crashes, restarts, error logs, etc.), power usage, and the like. Each of the device profiles 110 may include information describing the corresponding computing device 102, such as, for example, a system configuration, a unique identifier (e.g., serial number or service tag), a current location, a location where the device was manufactured, order data, shipping data, and the like. The device profile may information about how the hardware, software, and peripherals are being used, such as, for example, utilization by application, peripheral device usage profiles, overall system usage profile, and the like.

An agent on each of the computing devices 102 may periodically (e.g., at a predetermined time interval) send the corresponding device profile 110 to a server (e.g., cloud), such as the server 104 (e.g., the computing device 600). The server may compare the device profile with other device profiles of other computing devices to identify the subset of similar device profiles 126. The server may analyze the similar device profiles 126 to determine recommendations (e.g., based on the similar device profiles) to reduce the time taken to perform tasks that the computing device frequently performs. For example, frequently performed tasks may include tasks that are performed at least for a predetermined time period (e.g., at least 5 minutes) or at least a predetermined percentage of the time (e.g., at least 10% of the time that the device is used). The server may send the recommendations to the computing device. In some cases, the agent may automatically implement at least one of the recommendations. In other cases, the agent may display the recommendations along with an incentive (e.g., discount coupon, bonus reward points or the like) to purchase one or more of the recommended products (e.g., hardware, software, peripherals, or the like).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   one or more processors; and
   one or more non-transitory computer readable media storing instructions executable by one or more processors to perform operations comprising:
      determining a software profile that identifies:
         individual software applications installed on the computing device; and
         individual drivers installed on the computing device;
      creating a device profile based at least in part on the software profile;
      sending the device profile to a server;
      receiving one or more configuration recommendations from the server;
      automatically updating, based on the one or more configuration recommendations, at least one of a driver or a firmware associated with at least one of:
         the computing device; or
         a peripheral device that is connected to the computing device;
      modifying, based on the one or more configuration recommendations, at least one of a hardware configuration associated with the computing device or a software configuration with the computing device to create a modified computing device configuration; and
      determining that a particular software application that is installed on the computing device:
         executes faster on the modified computing device compared to the computing device; or
         uses less of at least one hardware resource of the modified computing device configuration.

2. The computing device of claim 1, wherein the software profile identifies:
   one or more software applications that are installed on the computing device;
   an amount of time that each software application of the one or more software applications is used within a particular time period; and
   software configuration data associated with each software application of the one or more software applications.

3. The computing device of claim 1, determining a hardware profile that identifies:
   one or more hardware components associated with the computing device, the one or more hardware components comprising:
      components included in the computing device; and
      peripheral devices that have been connected to the computing device;
   the amount of time that each the one or more hardware components is used within the particular time period;
   an amount of resource usage associated with each the one or more hardware components within the particular time period; and
   hardware configuration data associated with each software application of the one or more software applications.

4. The computing device of claim 1, wherein the one or more configuration recommendations are determined based at least in part on:
   comparing the software profile of the computing device with individual software profiles of individual other computing devices that are similar to the computing device; and
   comparing the hardware profile of the computing device with individual hardware profiles of the individual other computing devices that are similar to the computing device.

5. The computing device of claim 1, wherein the other computing devices that are similar to the computing device are determined based on determining a similarity index between the computing device and each of the other computing devices.

6. The computing device of claim 1, wherein the one or more configuration recommendations comprise at least one of:
   one or more software configuration modifications to a software configuration of at least one software application that is installed on the computing device;
   one or more hardware configuration modifications to a hardware configuration of at least one hardware component that is included in the computing device; or
   one or more peripheral configuration modifications to a peripheral configuration at least one peripheral device that is associated with the computing device.

7. The computing device of claim 1, wherein the one or more configuration recommendations comprise at least one of:
uninstalling, on the computing device, a currently installed software application;
installing, on the computing device, a particular software application;
uninstalling, from the computing device, a currently installed hardware component;
installing, in the computing device, a particular hardware component; or
connecting a recommended peripheral device to the computing device.

8. One or more non-transitory computer readable media storing instructions executable by one or more processors to perform operations comprising:
determining a software profile that identifies:
individual software applications installed on the computing device; and
individual drivers installed on the computing device;
creating a device profile based at least in part on the software profile;
sending the device profile to a server;
receiving one or more configuration recommendations from the server;
automatically updating, based on the one or more configuration recommendations, at least one of a driver or a firmware associated with at least one of:
the computing device; or
a peripheral device that is connected to the computing device;
modifying, based on the one or more configuration recommendations, at least one of a hardware configuration associated with the computing device or a software configuration with the computing device to create a modified computing device configuration; and
determining that a particular software application that is installed on the computing device:
executes faster on the modified computing device compared to the computing device; or
uses less of at least one hardware resource of the modified computing device configuration.

9. The one or more non-transitory computer readable media of claim 8, wherein the software profile identifies:
one or more software applications that are installed on the computing device;
an amount of time that each software application of the one or more software applications is used within a particular time period; and
software configuration data associated with each software application of the one or more software applications.

10. The one or more non-transitory computer readable media of claim 8, the operations further comprising determining a hardware profile that identifies:
one or more hardware components associated with the computing device, the one or more hardware components comprising:
components included in the computing device; and
peripheral devices that have been connected to the computing device;
the amount of time that each the one or more hardware components is used within the particular time period;
an amount of resource usage associated with each the one or more hardware components within the particular time period; and
hardware configuration data associated with each software application of the one or more software applications.

11. The one or more non-transitory computer readable media of claim 8, wherein the one or more configuration recommendations are determined based at least in part on:
comparing the software profile of the computing device with individual software profiles of individual other computing devices that are similar to the computing device; and
comparing the hardware profile of the computing device with individual hardware profiles of the individual other computing devices that are similar to the computing device.

12. The one or more non-transitory computer readable media of claim 8, wherein the other computing devices that are similar to the computing device are determined based on determining a similarity index between the computing device and each of the other computing devices.

13. The one or more non-transitory computer readable media of claim 8, wherein the one or more configuration recommendations comprise at least one of:
one or more software configuration modifications to a software configuration of at least one software application that is installed on the computing device;
one or more hardware configuration modifications to a hardware configuration of at least one hardware component that is included in the computing device; or
one or more peripheral configuration modifications to a peripheral configuration at least one peripheral device that is associated with the computing device.

14. The one or more non-transitory computer readable media of claim 8, wherein the one or more configuration recommendations comprise at least one of:
uninstalling, on the computing device, a currently installed software application;
installing, on the computing device, a particular software application;
uninstalling, from the computing device, a currently installed hardware component;
installing, in the computing device, a particular hardware component; or
connecting a recommended peripheral device to the computing device.

15. A server comprising:
one or more processors; and
one or more non-transitory computer readable media storing instructions executable by the one or more processors to perform operations comprising:
receiving, from a computing device, a device profile comprising:
a software profile identifying a usage of software applications associated with the computing device; and
a hardware profile identifying:
one or more hardware components associated with the computing device, the one or more hardware components comprising:
components included in the computing device; and
peripheral devices that have been connected to the computing device;
an amount of time that each the one or more hardware components is used within the particular time period; and an amount of resource usage associated with each the one or more hardware components within the particular time period;

performing a comparison of the device profile with other device profiles associated with other computing devices;

determining, based on the comparison, a Jaccard index indicating a similarity of the device profile with the other device profiles;

selecting a subset of the other device profiles based at least in part on the similarity index;

determining one or more configuration differences between the device profile of the computing device and individual device profiles of the subset of the other device profiles;

determining one or more configuration recommendations based on the one or more configuration differences; and sending the one or more configuration recommendations to the computing device, wherein the one or more configuration recommendations instruct the computing device to automatically update either a firmware or a driver associated with at least one of:
the computing device; or
a peripheral device that is connected to the computing device.

16. The server of claim 15, wherein the software profile comprises:
one or more software applications that are installed on the computing device;
an amount of time that each software application of the one or more software applications is used within a particular time period; and
software configuration data associated with each software application of the one or more software applications.

17. The server of claim 15, wherein the one or more configuration differences comprise:
a hardware configuration difference between a hardware configuration of:
a hardware component associated with the computing device; and
at least one device of the subset of the other computing devices.

18. The server of claim 15, wherein the one or more configuration differences comprise:
a software configuration difference between a software configuration of:
a software application that is installed on the computing device; and
at least one device of the subset of the other computing devices.

19. The server of claim 15, wherein the one or more configuration recommendations comprise at least one of:
one or more software configuration modifications to a software configuration of at least one software application that is installed on the computing device;
one or more hardware configuration modifications to a hardware configuration of at least one hardware component that is included in the computing device; or
one or more peripheral configuration modifications to a peripheral configuration at least one peripheral device that is associated with the computing device.

20. The server of claim 15, wherein the one or more configuration recommendations comprise at least one of:
uninstalling, on the computing device, a currently installed software application;
installing, on the computing device, a particular software application;
uninstalling, from the computing device, a currently installed hardware component;
installing, in the computing device, a particular hardware component; or
connecting a recommended peripheral device to the computing device.

* * * * *